United States Patent
Belkin et al.

[19]

[11] Patent Number: 6,151,501
[45] Date of Patent: Nov. 21, 2000

[54] METHOD AND APPARATUS FOR ALERTING A COMMUNICATION UNIT OF A SERVICE REQUEST IN A COMMUNICATION SYSTEM

[75] Inventors: Anatoly S. Belkin, Mt. Prospect; Ralph G. Riley, Schaumburg; Robert L. Epsom, Inverness; Kamala D. Urs, Bartlett, all of Ill.

[73] Assignee: Motorola, Inc., Schaumburg, Ill.

[21] Appl. No.: 09/209,098

[22] Filed: Dec. 10, 1998

[51] Int. Cl.[7] .................................................. H04Q 7/20
[52] U.S. Cl. ........................ 455/436; 455/414; 455/435; 455/517; 455/518; 455/519; 379/58
[58] Field of Search .................................. 455/507, 509, 455/510, 512, 515, 518, 519, 426, 414, 51.7, 9, 435, 422

[56] References Cited

U.S. PATENT DOCUMENTS

| | | |
|---|---|---|
| 5,548,631 | 8/1996 | Krebs et al. .............................. 455/426 |
| 5,592,533 | 1/1997 | McHenry et al. ........................ 455/435 |
| 5,598,417 | 1/1997 | Crisler et al. ............................. 370/348 |
| 5,613,213 | 3/1997 | Naddell et al. ........................... 455/414 |
| 5,898,730 | 4/1999 | Hensley et al. .......................... 375/224 |
| 5,970,417 | 10/1999 | Toyryla et al. .......................... 455/519 |
| 6,081,707 | 6/2000 | Christensen et al. .................... 455/413 |

Primary Examiner—Daniel S. Hunter
Assistant Examiner—Yemane Woldetatios
Attorney, Agent, or Firm—Jeffrey K. Jacobs

[57] ABSTRACT

A communication unit (118) provides service information related to a second communication service to a base site (114) that provides a first communication service to the communication unit (118). The base site (114) receives the service information, stores the service information, and receives a service request for the communication unit (118) to participate in the second communication service. Finally, the base site (114) transmits a control message to the communication unit (118), via a control communication resource, to alert the communication unit (118) as to requested participation in the second communication service.

19 Claims, 2 Drawing Sheets

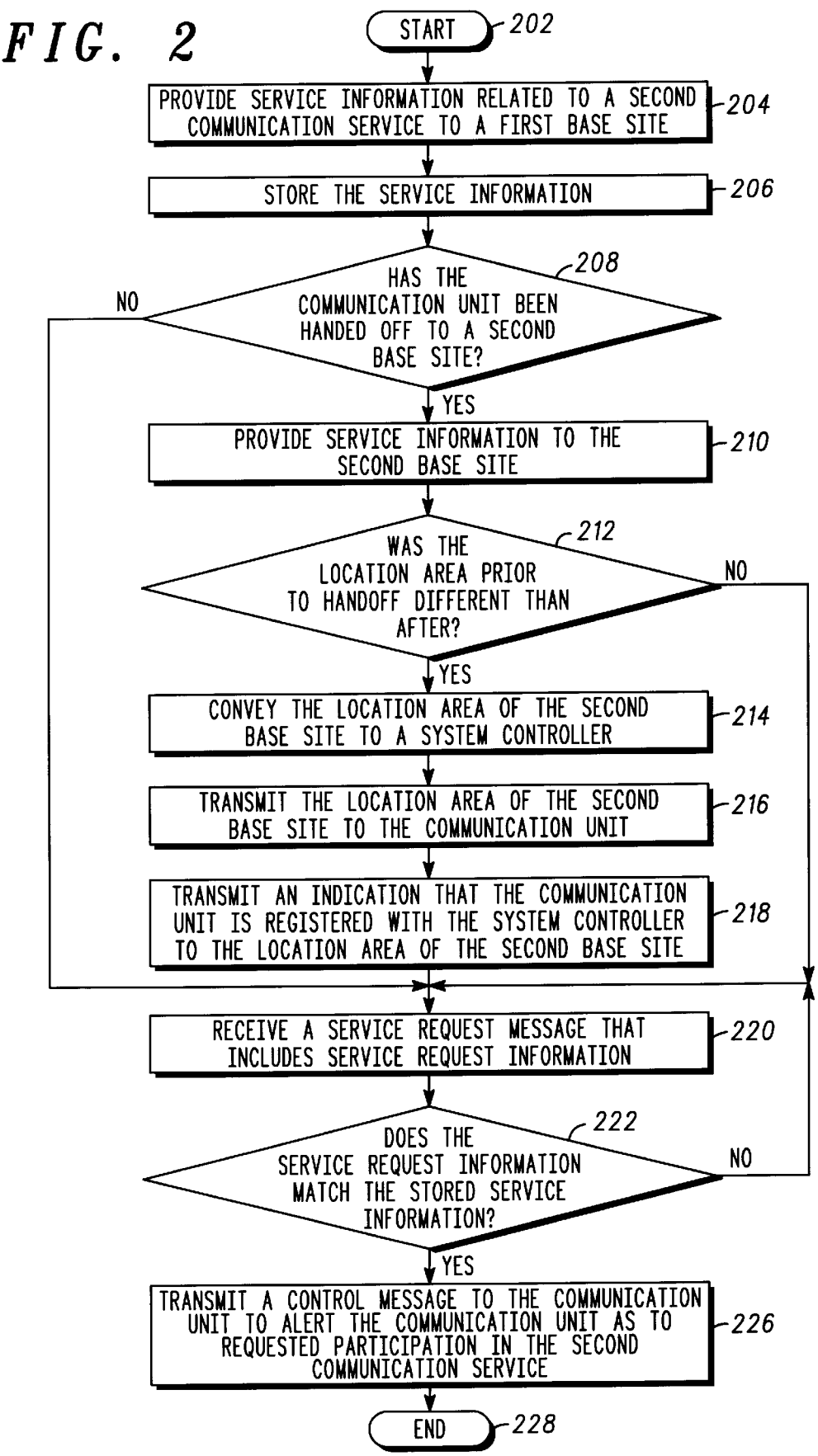

METHOD AND APPARATUS FOR ALERTING A COMMUNICATION UNIT OF A SERVICE REQUEST IN A COMMUNICATION SYSTEM

FIELD OF THE INVENTION

The present invention relates generally to communication systems and, in particular, to a method and apparatus for alerting a communication unit of a service request in a communication system.

BACKGROUND OF THE INVENTION

A wide variety of communication services are available to consumers today. To simplify a user's access to multiple services, communication systems which provide complimentary communication services are being combined and integrated. This allows a consumer to subscribe to one service provider and buy one device which meets many, if not all, of his or her communication needs.

Communication systems, such as "MOTOROLA" "iDEN" systems, provide both interconnect and dispatch communication services. The interconnect services are those traditionally provided by cellular systems and include wireless telephone service, voice mail service, and paging or short message service. The dispatch services are those traditionally provided by two-way radio systems and include group call service, private call service, and call alert service.

The dispatch services allow a user to communicate in ways that are difficult or costly using today's cellular systems. The group call service, for example, enables a user to communicate with a group of people simultaneously and substantially instantaneously. Using a cellular system, such a call could not be established as quickly since either telephone numbers would need to be dialed for a three-way call or arrangements would need to be made to setup a conference call.

Systems that provide both interconnect and dispatch communication services typically have separate controllers, i.e. interconnect controllers and dispatch controllers. The need to minimize development costs and time-to-market makes such a system architecture desirable. However, in a system with independent controllers a user of a service supported by one controller may be unable to contact a user involved in a service supported by the other controller. For example, the group call service, a dispatch service that allows a group of users to communicate, is not able to contact users involved in interconnect services such as telephone calls. The group call must wait for all participants to complete telephone calls in progress or proceed without the participation of some group members.

Likewise, an urgent incoming telephone call is busied while a user completes a dispatch communication in progress. In both cases, a communication service of one type must wait for the completion of a communication service of the other type. In such instances, time is wasted and urgent communications may be delayed.

Again, systems today which provide both interconnect and dispatch communication services have separate controllers. In order to alert a user engaged in one service of another pending service, knowledge of both services is required. When each controller contains knowledge of only one of the services, as is the case when one service is interconnect and the other service is dispatch, such alerting cannot be performed. Therefore, a need exists for an apparatus and method for alerting a communication unit engaged in a communication service supported by one controller of a pending request to participate in a communication service supported by a different controller.

BRIEF DESCRIPTION OF THE DRAWINGS

FIG. 2 illustrates a logic flow diagram of steps executed by the communication system in accordance with the preferred embodiment of the present invention.

DESCRIPTION OF A PREFERRED EMBODIMENT

Figure 1:
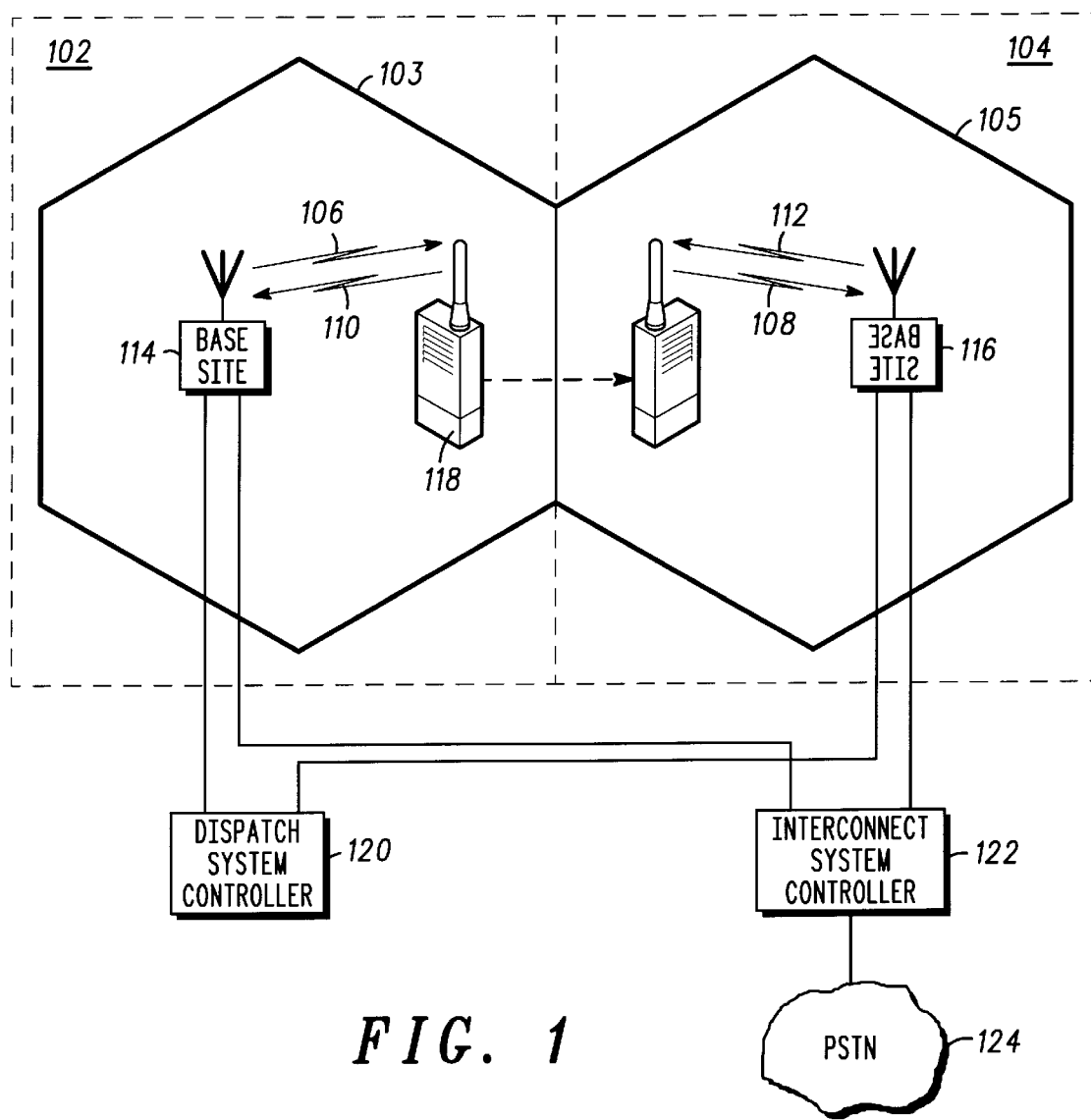
FIG. 1 illustrates a block diagram depiction of a communication system in accordance with a preferred embodiment of the present invention.

Generally, the present invention provides an apparatus and method for alerting a communication unit engaged in a communication of a service request to participate in another communication. A communication unit provides service information related to a second communication service to a base site that provides a first communication service to the communication unit. The base site receives the service information, stores the service information, and receives a service request for the communication unit to participate in the second communication service. Finally, the base site transmits a control message to the communication unit, via a control communication resource, to alert the communication unit as to requested participation in the second communication service.

By providing service information that is related to the second communication service to the base site that is providing the first communication service, the communication unit enables the base site to determine that the service request received is a request for the communication unit to participate in the second communication service. Without the service information, the base site would not know that the communication unit was able to be interrupted during the first communication service by service requests for the second communication service. Since the base site provides communication services to the communication unit while the communication unit remains in the base site's coverage area, service requests are sent to the base site. Thus, the base site, when provided with service information from the communication unit, can appropriately alert the communication unit, when engaged in communication, of other service requests per the service information.

The present invention can be more fully understood with reference to FIGS. 1 and 2. FIG. 1 illustrates a block diagram depiction of a communication system 100 in accordance with a preferred embodiment of the present invention. Communication system 100 comprises a communication unit 118, a plurality of base sites 114 and 116, a plurality of system controllers 120 and 122, and a public switched telephone network (PSTN) 124. The geographical area throughout which base site 114 can provide communication service is the service coverage area 103, and the geographical area throughout which base site 116 can provide communication service is the service coverage area 105. The service coverage areas of communication system 100 are divided into location areas for location tracking purposes. Service coverage area 103 resides in location area 102, and service coverage area 105 resides in location area 104. Although coverage areas 103 and 105 are depicted as the only coverage areas within location areas 102 and 104 respectively, location areas may include multiple coverage areas.

Preferably, multi-cell communication system 100 comprises an "iDEN" communication system, all components of which are commercially available from "MOTOROLA", Inc. of Schaumburg, Ill. Accordingly, communication unit 118 is preferably an "iDEN" phone, and base sites 114 and 116 are preferably "iDEN" Enhanced Base Transceiver System (EBTS) sites. Dispatch system controller 120 preferably comprises an "iDEN" Dispatch Application Processor (DAP), and interconnect system controller 122 preferably comprises an "iDEN" Base Site Controller (BSC).

Operation of communication system 100 occurs, in accordance with the present invention, substantially as follows. Base site 114 provides a first communication service to communication unit 118, located in service coverage area 103 of location area 102. In the preferred embodiment, the first communication service is either an interconnect service, such as telephone call service, supported by interconnect system controller 122, or a dispatch service, such as group call service, supported by dispatch system controller 120. For the purpose of the present discussion, the reader will consider the first communication service to be the telephone call service. In addition to providing telephone call service, base site 114 receives service information from communication unit 118 related to a second communication service. Again for the purpose of the present discussion, the reader will consider the second communication service to be the group call service. The service information received relates to the group call service, therefore, and would preferably include information such as identification of the communication unit and identification of the communication unit's talkgroup.

Base site 114 stores the service information related to the group call service for communication unit 118. Preferably, the service information would comprise a talkgroup identifier, for example, to identify the group to which communication unit 118 belongs for group call service. Were instead the first communication service a group call service and the second communication service a telephone call service, the service information would preferably comprise a telephone number of communication unit 118.

Communication between base site 114 and communication unit 118 occurs via outbound communication resource 106 and inbound communication resource 110. In the preferred embodiment, communication resources 106 and 110 are comprised of one or more time divisioned, radio frequency channels. Thus, since telephone communication service involves both outbound and inbound communication between base site 114 and communication unit 118, telephone communication service is provided by the base site via communication resources 106 and 110.

While base site 114 is providing telephone call service to communication unit 118, dispatch system controller 120 sends base site 114 a service request message requesting communication unit 118 to participate in a second communication service, group call service. Preferably, the service request message is sent by dispatch system controller 120 as dispatch system controller 120 sets up a dispatch call initiated by a second user. In response to the service request message, base site 114 transmits a control message to communication unit 118 to alert communication unit 118 as to requested participation in the group call service. The control message is an alert message that alerts communication unit 118 of the pending service request. In response to the control message, communication unit 118 preferably alerts the user audibly, although it may also alert the user visually or by vibrating. The user of communication unit 118 can then choose whether to continue with the telephone call service or to use the group call service to respond to the second user.

While base site 114 is providing telephone call service to communication unit 118, communication unit 118 may leave service coverage area 103 of base site 114. To maintain the telephone call service outside of service coverage area 103, communication unit 118 hands off to a second base site 116 using known handoff techniques. Once communication unit 118 moves (shown in FIG. 1 with the dashed arrow) into service coverage area 105 of base site 116 and hands off to base site 116, base site 116 provides service to communication unit 118. Specifically, then, after the handoff, base site 116 provides telephone service to communication unit 118 via inbound communication resource 108 and outbound communication resource 112. In the preferred embodiment, communication resources 108 and 112, like communication resources 106 and 110, are comprised of one or more time divisioned, radio frequency channels.

When communication unit 118 moved from service coverage area 103 into service coverage area 105, communication unit 118 also left location area 102 and entered location area 104. In the preferred embodiment, system controllers 120 and 122 store a location area identifier for communication unit 118 indicating the location area in which communication unit 118 is currently located. Prior to the communication unit 118 handing off, therefore, the dispatch system controller 120 preferably stores a location area identifier associated with the location area for the communication unit 118 prior the handoff, location area 102. When communication unit 118 hands off to base site 116, base site 116 conveys to dispatch system controller 120 the location area identifier associated with the new location area of the communication unit 118, in this case, location area 104. Alternatively, base site 114 could instead convey to dispatch system controller 120 the location area identifier. In either case, dispatch system controller 120 is informed of the new location area for communication unit 118 and can, therefore, appropriately route dispatch service requests for communication unit 118 even while communication unit 118 remains engaged in the telephone call service.

Additionally, when communication unit 118 hands off to base site 116, base site 116 receives the service information related to the group call service and stores the service information. In the preferred embodiment, base site 116 receives the service information from communication unit 118. In an alternate embodiment, however, base site 116 may receive the service information from base site 114 instead.

FIG. 2 illustrates a logic flow diagram 200 of steps executed by a communication system in accordance with a preferred embodiment of the present invention. The logic flow begins (202) when a communication unit provides (204) service information related to a second communication service to a first base site. The first base site provides a first communication service to the communication unit. Preferably, the service information is provided to the first base site during the call set-up procedure associated with the first communication service. For example, when a communication unit and base site are engaged in setting up a telephone call (i.e., an interconnect service), the communication unit provides the base site service information related to one or more dispatch services.

In the preferred embodiment, the service information provided by the communication unit comprises the following information pertaining to the communication unit: system service area, location area, communication unit identification, talkgroup identification, and Internet Protocol (IP) identification. The system service area and location area refer to the geographical location of the communication unit within the communication system. The service area and location area are preferably related hierarchically, with a service area comprising one or more location areas. The communication unit identification and talkgroup identification are preferably identifiers that differentiate the communication unit from other communication units and differentiate the talkgroup of which the communication unit is a member from other talkgroups within the communication system. The IP identification is preferably the IP address of the communication unit. In an alternate embodiment, information related to the communication unit with regard to communication service features (i.e., feature control information) may also be included in the service information.

Upon receiving the service information from the communication unit, the first base site stores (206) the service information. In the preferred embodiment, the base site, while providing the first communication service to the communication unit, determines (208) whether the communication unit has been handed off to a second base site. When the communication unit has been handed off to the second base site, the service information is provided (210) to the second base site. Preferably, the communication unit provides the service information to the second base site via a control communication resource. In an alternate embodiment, the first base site, instead of the communication unit, could provide the service information to the second base site.

The location area identification is preferably included in the service information provided to the second base site. The second base site compares (212) the identification of the location area in which the communication unit was located prior to handoff to the identification of a location area in which the second base site resides. When the identification of the location area in which the communication unit was located prior to handoff is different than the identification of the location area in which the second base site resides, the second base site conveys (214) the identification of the location area in which the second base site resides to a system controller. This informs the system controller of the new location area for the communication unit. The second base site conveys the identification of the location area in which the second base site resides to the system controller which supports the second communication service. Thus, the second base site registers the communication unit in the new location area with the system controller which supports the second communication service.

In the preferred embodiment, then, the second base site transmits (216) the identification of the location area in which the second base site resides to the communication unit. The second base site also transmits (218) an indication that the communication unit is registered with the system controller to the location area in which the second base site resides.

If, at step 212, it is determined that the location area in which the communication unit was located prior to handoff is the same as the location area in which the second base site resides, then location area registration with the system controller is not necessary (i.e., steps 214, 216, and 218 are not performed). If the communication unit has not been handed off, as determined at step 208, to a second base site, the first base site has the service information and continues to provide the first communication service to the communication unit. Thus, steps 210, 212, 214, 216 and 218 are skipped when the communication unit has not been handed off to a second base site. Although FIG. 2 only refers to a first and second base site, the communication unit could hand off to any number of base sites. Steps 210, 212, 214, 216 and 218 represent the processing which would be performed for each handoff in accordance with the preferred embodiment.

The base site which is providing the first communication service to the communication unit, possibly after multiple handoffs, receives (220) a service request for the communication unit to participate in the second communication service. Preferably, the service request comprises a service request message that includes service request information related to the communication unit. The base site then compares (222) the service request information to the stored service information for the communication unit. In the preferred embodiment, the base site may need to search through the stored information for multiple communication units to determine for which communication units the stored information matches the service request information. If the service request information does not match the stored information for the communication unit, the logic flow returns to step 220 and the next service request message is received. Upon finding a match for the communication unit, however, the base site determines that the service request message is requesting that the communication unit participate in the second communication service.

To notify the communication unit of the service request which is pending at the base site, the base site transmits (226) a control message to the communication unit via a control communication resource to alert the communication unit as to requested participation in the second communication service. Depending on the service of the service request, the control message preferably includes one or more of following types of information: the identification of the calling communication unit, the identification of the calling user, and the identification of the talkgroup. The control communication resource used to transmit the control message is preferably a control channel, although alternatively, the control communication resource could be a portion of a traffic channel used for transmitting control information. Finally, upon transmitting the control message, the logic flow ends (228).

In the present invention the base site which provides the first communication service to the communication unit is provided with information related to other communication unit services. Providing such information to the base site enables the base site to evaluate service requests for the communication unit and determine that the communication unit's participation in another service is requested.

The present invention provides an apparatus and method for alerting a communication unit engaged in a communication service supported by one system controller of a pending request to participate in a communication service supported by another system controller. In systems today, the communication unit's service information for a particular communication service is known only to the communication unit and the system controller which supports the particular communication service. When one system controller is supporting a communication service for a communication unit, a second system controller has no way to request the communication unit's participation in a service the second system controller provides.

With the present invention, the base site which provides the first communication service to the communication unit alerts the communication unit of service requests from other system controllers. Since system controllers already communicate service requests to base sites, no new means of communication involving system controllers is required. Thus, the expense and delay of alternatives such as developing a means of communication between system controllers or combining the system controllers are avoided.

While the present invention has been particularly shown and described with reference to particular embodiments thereof, it will be understood by those skilled in the art that various changes in form and details may be made therein without departing from the spirit and scope of the present invention.

We claim:

1. A method for alerting a communication unit of a service request in a communication system, the communication system comprising a base site that provides a plurality of communication services to the communication unit, the method comprising the steps of:

provided, by the base site, a first communication service to the communication unit;

receiving, by the base site, service information that is related to a second communication service;

storing, by the base site, the service information to produce stored service information;

receiving, by the base site while the base site is providing the first communication service to the communication unit, a service request for the communication unit to participate in the second communication service; and transmitting, by the base site while the base site is providing the first communication service to the communication unit, a control message to the communication unit via a control communication resource to alert the communication unit as to requested participation in the second communication service.

2. The method of claim 1, wherein the step of receiving service information comprises the step of receiving the service information during a call set-up procedure associated with the first communication service.

3. The method of claim 1, wherein the step of receiving a service request comprises the steps of:

receiving, by the base site, a service request message that includes service request information for the communication unit;

comparing, by the base site, the service request information to the stored service information; and determining, by the base site, whether the service request message is requesting that the communication unit participate in the second communication service.

4. The method of claim 1, wherein the step of receiving comprises the step of receiving service information selected from the group of system service area, location area, communication unit identification, talkgroup identification, Internet Protocol identification, and feature control information.

5. The method of claim 1, wherein the step of transmitting a control message comprises the step of transmitting control information selected from the group of identification of a calling communication unit, identification of a calling user, and identification of a talkgroup.

6. The method of claim 1, wherein the step of transmitting a control message comprises the step of transmitting a control message to the communication unit via a portion of a traffic channel.

7. The method of claim 1, wherein the step of transmitting a control message comprises the step of transmitting a control message to the communication unit via a control channel.

8. In a communication system that includes a system controller and a plurality of base sites, the plurality of base sites providing a plurality of communication services to a communication unit, a method for the communication unit presently engaged in a first communication service to be alerted as to requested participation of the communication unit in a second communication service, the method comprising the steps of:

providing, by a first base site, a first communication service to the communication unit;

providing, by the communication unit, service information that is related to the second communication service to the first base site;

storing, by the first base site, the service information;

determining, by the first base site, whether the communication unit has been handed off to a second base site;

when the communication unit has been handed off to the second base site, providing the service information to the second base site;

receiving, by the second base site while the second base site is providing the first communication service to the communication unit, a request for the communication unit to participate in the second communication service; and transmitting, by the second base site while the second base site is providing the first communication service to the communication unit, a control message to the communication unit via a control communication resource to alert the communication unit as to requested participation in the second communication service.

9. The method of claim 8, wherein the step of providing the service information to the second base site comprises the step of providing, by the first base site, the service information to the second base site.

10. The method of claim 8, wherein the step of providing the service information to the second base site comprises the step of providing, by the communication unit, the service information to the second base site via a control communication resource.

11. The method of claim 8, wherein the communication system is divided into a plurality of location areas, wherein each location area includes at least one base site service coverage area, and wherein the service information includes an identification of a location area in which the communication unit was located prior to handoff, the method further comprising the steps, prior to the step of receiving the request, of:

comparing the identification of the location area in which the communication unit was located prior to handoff to an identification of a location area in which the second base site resides; and when the identification of the location area in which the communication unit was located prior to handoff is different than the identification of the location area in which the second base site resides, conveying, by the second base site, the identification of the location area in which the second base site resides to a system controller to inform the system controller of a new location area for the communication unit.

12. The method of claim 11, further comprising the step of transmitting, by the second base site, the identification of the location area in which the second base site resides to the communication unit.

13. The method of claim 11, further comprising the step of transmitting, by the second base site, an indication that the communication unit is registered with the system controller to the location area in which the second base site resides.

14. A communication infrastructure comprising:

a base site that provides a first communication service to a communication unit, that receives service information related to a second communication service, and that stores the service information; and a system controller, coupled to the base site, that sends the base site a service request message requesting the communication unit to participate in the second communication service, wherein the base site, while providing the first communication service to the communication unit and in response to the service request message, transmits a control message to the communication unit to alert the communication unit as to requested participation in the second communication service.

15. The communication infrastructure of claim 14 wherein the base site receives the service information from the communication unit.

16. The communication infrastructure of claim 14 further comprising a second base site, coupled to the system controller, that provides the first communication service to the communication unit when the communication unit hands off to the second base site, that receives the service information related to the second communication service when the communication unit hands off to the second base site, and that stores the service information.

17. The communication infrastructure of claim 16 wherein the second base site receives the service information from the communication unit.

18. The communication infrastructure of claim 16 wherein the second base site receives the service information from the base site.

19. The communication infrastructure of claim 16 wherein the base site resides in a first location area; wherein the system controller stores a location area identifier associated with the first location area for the communication unit prior to the communication unit handing off to the second base site; wherein the second base site resides in a second location area; and wherein the second base site conveys to the system controller an identifier associated with the second location area to inform the system controller of a new location area for the communication unit when the communication unit hands off to the second base site.

* * * * *